United States Patent [19]

Gleim et al.

[11] Patent Number: 4,862,045
[45] Date of Patent: Aug. 29, 1989

[54] METHOD AND APPARATUS FOR CONTROLLING THE NUMBER OF REVOLUTIONS OF A ROTOR

[75] Inventors: Günter Gleim, Villingen; Dietmar Uhde, Königsfeld, both of Fed. Rep. of Germany

[73] Assignee: Deutsche Thomson-Brandt GmbH, Villingen-Schwenningen, Fed. Rep. of Germany

[21] Appl. No.: 200,145

[22] Filed: May 31, 1988

[30] Foreign Application Priority Data

May 29, 1987 [DE] Fed. Rep. of Germany ....... 3718207

[51] Int. Cl.$^4$ .......................................... H02K 29/10
[52] U.S. Cl. .................................... 318/254; 318/138
[58] Field of Search ............... 318/138, 254, 313, 439

[56] References Cited

U.S. PATENT DOCUMENTS 3,683,248  8/1972  Kobayashi et al.
4,348,585  9/1982  Hoffman.
4,366,399 12/1982  Furuhata.
4,409,530 10/1983  Neeper et al. ................. 318/254 X
4,506,202  3/1985  Tajima et al.
4,570,110  2/1986  Bloom et al. ........................ 318/313
4,600,866  7/1986  Seto ..................................... 318/313

Primary Examiner—Bentsu Ro
Attorney, Agent, or Firm—Spencer & Frank

[57] ABSTRACT

A method of controlling the number of revolutions of a motor using the output of a tachogenerator, which determines the number of revolutions of the rotor, to regulate the motor. To improve the accuracy of such prior art regulating methods, which are limited by the mechanical tolerances of the tachogenerator elements, the actual time differences between pulses corresponding to respective fixed points on the rotor circumference during a revolution of the rotor are measured. The sequence of the pulses constituting the actual time differences is compared with a desired time difference sequence and a signal to control the driving motor is derived from this comparison.

3 Claims, 1 Drawing Sheet

METHOD AND APPARATUS FOR CONTROLLING THE NUMBER OF REVOLUTIONS OF A ROTOR

BACKGROUND OF THE INVENTION

The present invention relates to an improved method of controlling the number of revolutions, i.e., speed, of a rotor by means of a tachogenerator, i.e., tachometer, as well as to an apparatus for carrying out the improved method.

In connection with electronically controlled drives, it is known to generate pulses when a point or points on the driven shaft (rotor) pass a fixed point, with the time sequence of these pulses providing information about the respective rate of rotation of the shaft or the rotor. The thus generated pulse repetition frequency is fed into electronic evaluation circuits which make a comparison, for example, with a desired frequency and derive a voltage to adjust the number of revolutions of the motor.

The pulses are generated by means of a so-called tachogenerator or tachometer, with the type of generation possibly being quite different. For example, mechanical, electromagnetic or optoelectronic tachogenerators may be employed. All generators performing more than one pulse evaluation per revolution have in common that, due to the mechanical arrangement of the individual generator elements, tolerance variations exist during one revolution of the rotor so that the emitted pulse repetition rate is not constant during one revolution of the shaft in spite of a uniform rate of rotation.

If such a generator which is subject to tolerance variations controls, for example, a PLL (phase locked loop) with low internal time constants, the output signal of the PLL during one revolution reflects these tolerances although, with a constant rate of rotation, the output signal should also be constant. Thus, undesirable regulating processes may be initiated during one revolution of the rotor.

SUMMARY OF THE INVENTION

It is an object of the present invention to avoid undesired regulating processes in tachogenerators which are subject to tolerances.

The above object is basically achieved according to the method of the present invention by a method of controlling the number of revolutions of a rotor including generating a sequence of n pulses per revolution of the rotor with each pulse being generated when a respective one of n points on the circumference of the rotor passes a fixed point, evaluating the sequence of pulses to provide at least one control signal, and the said at least one control signal to control the number of revolutions of the rotor; and wherein the step of evaluating includes the following steps:

determining the actual time difference between corresponding ones of the pulses of the sequence at the end of at least one complete revolution of the rotor; producing a first signal corresponding to a sequence corresponding the determined the actual time differences and comparing the first signal with a second signal corresponding to a sequence representing a desired time difference to derive the at least one control signal.

In principle, the time difference between each two pulses from the same generator element of the tachogenerator is utilized for evaluation, with the pulses of successive revolutions, or also, for example, of every third revolution, being evaluated. For example, for each generator element to be evaluated, two memories are provided into which the generated pulses are alternatingly written so that the time difference between the pulses of this generator element can be determined during revolution of the rotor. This is done in an evaluation circuit which is connected with the outputs of the memories. If the time differences of all pulses of the generator elements to be evaluated are identical, the rate of rotation is constant.

The thus determined actual time differences of all tachoelements, i.e., generator elements, to be evaluated are read out in succession and are compared in an evaluation circuit, for example a PLL, with a desired sequence of time differences. As a result of this comparison, a signal is then generated which serves to adjust the number of revolutions of the motor.

To be able to detect which pulse from the tachogenerator is to be fed into the respectively "applicable" memory, a marker, for example, or the rotor, may serve to fix or identify a particular pulse. By evaluating this marker it is possible, for example, by means of counter circuits, to fix or synchronize the association of the individual pulses with the respective memories. Upon completion of the time difference measurement, the counting circuits serve to set back and newly occupy or overwrite the memory used first.

It is also possible to perform a time difference measurement with but one memory. In such case, the first value is stored in the memory. The second value is compared with the first stored value, and then the second value is written into that memory in which the first value was stored before the comparison.

The present invention has particular advantage when used for motors in which, in addition to precisely maintaining a desired velocity or speed, it is also important to have a motor which responds precisely to acceleration and deceleration processes. Examples for such use are motors for digital or analog signal recording devices.

The invention will be described below in greater detail for one embodiment which is illustrated in the drawing figures.

DETAILED DESCRIPTION OF THE INVENTION

Figures 1, 2:
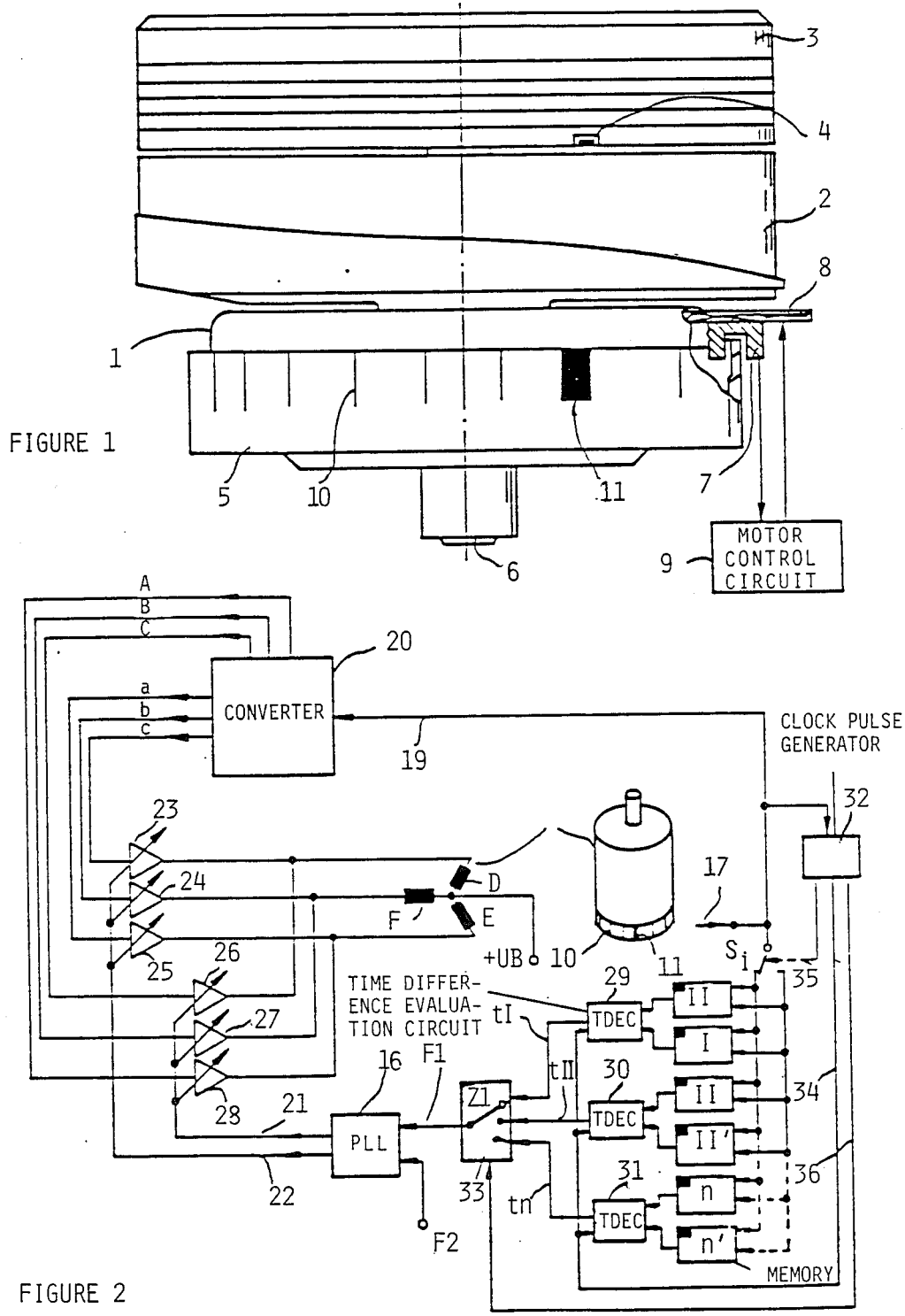
FIG. 1 shows an electronically commutated motor in combination with a head drum arrangement for a magnetic tape recorder and a tachogenerator.
FIG. 2 is a block circuit diagram for the motor control according to the invention of an electronically commutated direct current motor.

FIG. 1 shows an electronically commutated motor in combination with a head drum arrangement for a magnetic tape recorder. The motor is composed, in a known manner, of a stator 1 in which commutatable coils (not shown) are arranged in a circle, and a rotor 5 in which magnets (not shown) are arranged on a circular path to face the stator coils at a distance which defines an air gap. Rotor 5 is fastened on a common shaft 6 with the upper rotating head drum 3, while the lower stationary head drum 2 is fixed to the stator 1.

In order to provide the tachogenerator for control of the motor, the rotor 5 is provided with a plurality of spaced code bars 10 and 11 on its outer circumference.

In the illustrated embodiment, the tachogenerator is an electro-optic generator and the edge of the outer rotor member, which is made of transparent plastic, enters into the gap of a forktype light barrier 7. Each of the bar code bars 10, 11 generates a pulse when it passes through the light barrier 7 as the motor rotates, with the resulting succession of these pulses being fed to a motor control circuit 9 which derives a control signal for the motor therefrom. The fork-type light barrier 7 is fastened on a circuit board 8 which projects from the stator member 1 of the motor and the fork-like light barrier 7 is arranged at a fixed relationship with the commutatable coils disposed in stator 1.

The code bars are arranged at a constant angular spacing on the circumference of the rotor 5 and in a defined association with the magnets disposed in the rotor. They may be oriented, for example, toward a pole change minimum for the rotor magnets. To identify the beginning of a revolution with the aid of code bars 10, 11, code bar 11 is different from the other, similar code bars 10, i.e., as shown code bar 11 is wider. In the illustrated arrangement, the code bar 11 is also oriented in a fixed relationship with the magnetic heads 4 disposed in upper head drum 3.

FIG. 2 is a block circuit diagram for the motor control circuit 9 of an electronically commutated direct current motor 18. Motor 18 includes three phase windings D, E and F. The individual phase windings are arranged in a star connection, with the center of the star being connected with the operating voltage +UB. Motor 18 is coupled to a sensor 17 which operates as optocoupler e.g., the light barrier 7 of FIG. 1, and detects the code bars 10, 11 applied to the circumference of the rotor. The output signals of sensor 17 are fed via a line 19 to a converter 20 wherein these signals are evaluated, for example by means of a microprocessor. The respective angular position with respect to the rotor is detected and a switching voltage is put out through output lines a, b, c and A, B, C by means of which the associated respective phase coil of motor 18 is switched on via the respective controllable amplifiers 23 to 28. The information regarding the phase position of the commutation is available in lines a, b, c and A, B, C during the entire period of operation. For example, output lines a, b, c are intended for commutation in the deceleration direction and lines A, B, and C are intended for commutation in the acceleration direction of the motor 18.

The actual direction of commutation and the intensity or magnitude of the commutation voltage are determined by the respective controllable amplifiers 23 to 28 which are connected as controllers between the output lines of converter 20 and the respective phase winding or coil terminals of motor 18. For example, output lines a, b and c for the deceleration direction are connected with respective inputs of amplifiers 23, 24 and 25 and output lines A, B and C for the acceleration direction are connected with the respective inputs of amplifiers 26, 27 and 28.

Amplifiers 23, 24 and 25 form a group whose parallel connected control inputs are connected via a line 22 with a PLL (Phase Lock Loop) circuit 16, while the likewise parallel connected control inputs of the group including amplifiers 26, 27 and 28 are connected to PLL circuit 16 via a line 21. The outputs of amplifiers 23 and 26 feed phase winding D, the outputs of amplifiers 24 and 27 feed phase winding F, and the outputs of amplifiers 25 and 28 feed phase winding E of motor 18.

Amplifier groups 23 to 25 and 26 to 28, are activated by way of control lines 22 and 21, respectively, in such a manner that the commutation signal present at the amplifier inputs is "switched through" to the phase coils of motor 18 by converter 20 as a function of the control signals in lines 21 and 22, respectively. The magnitude of the commutation current is here a function of the internal resistance of the "switched through" amplifier, i.e., the magnitude of the voltage present in the respective control lines 21 and 22. This voltage or these voltages are generated in PLL circuit 16. According to the invention, the magnitude of the voltages produced by the PLL circuit 16 and also the selection of the respective line 21 or 22 charged with voltage is a result of the comparison in the PLL circuit 16 of a sequence of pulses representing the actual time differences F1 derived from the number of revolutions of the motor with a sequence of pulses representing the sequence of desired time differences F2.

The detection of a code bar 10 or 11 along the circumference of the rotor by means of sensor 17 causes a tachofrequency to be generated from which the pulse sequence of actual time differences F1 is derived. If the number of revolutions of the motor rotor is as rated, the pulse sequence of actual time differences, i.e, F1, corresponds to the pulse sequence of desired time differences F2.

As long as F1 is greater than F2, PLL circuit 16 puts out a voltage in line 21 to control regulating amplifier group 26 to 28 which is responsible for the commutation in the acceleration direction. If, however, a number of revolutions is realized which, due to a reduction in the load, reaches a number of revolutions at which sensor 17 puts out a higher frequency, a signal is applied to line 21 and the motor is decelerated.

The magnitude of the respective gain control is thus derived in circuit 16 from the actual value compared to a desired value.

To determine the actual time difference values, the invention provides that the n pulses generated by sensor 17 during one revolution are written successively into one of a respective pair of memories I-I', II-II', ... n-n', each associated with a respective pulse within the generated pulse sequence, with the memory of each pair alternating by rotor revolutions.

For example, during a first revolution, the first generated pulse is fed into memory I. This may be a pulse, for example, which is generated by a motor as shown in FIG. 1 by the wide code bar 11. The next pulse is fed into memory II and the last pulse into memory n. During the next revolution, or a revolution following thereafter, this process is repeated, but now the pulses are fed into associated memory I', II' ... n', respectively. In this way, one time period or measuring period is stored for each tachoelement, i.e. code bar. The association of the pulses at the end of each revolution, or several revolutions, of the rotor is effected by means of a switch S1 which is controlled by a clock pulse generator 32 via a line 35.

The respective outputs of each memory pair, I-I', IIII', ... n-n' are connected with a respective circuit 29, 30 31 in which the two pulses generated by the same bar code are compared to determine the respective measuring periods tI, tII ... tn, i.e., the actual time differences.

After the respective differences has been determined, the memories containing the pulses fed in during the first revolution are reset successively in time, under control of switch S1, so that now the next pulses to be evaluated can be fed into these memories, i.e., memories I to n. This process is repeated alternatingly so that always the measuring periods generated by the last revolutions in one memory pair can be evaluated.

The evaluation of the stored times is made in time difference evaluation circuits 29 to 31 which are composed of, for example, a combination of IC's of the Standard-TTL-74 . . . and C-MOS 40 . . . series.

The outputs of circuits 29 to 31 are connected with the input of a time multiplex circuit 33. The circuits 29 to 31 are controlled by way of line 34 from clock pulse generator 32, which itself converts the clock pulse information from sensor 17, to feed the determined measuring periods tI to tn, respectively to the multiplex circuit 33, which is likewise actuated by clock pulse generator 32 via a line 36. The multiplex circuit 33 sequentially samples the outputs of the circuits 29–31 so that the determined pulse sequence representing the actual time differences sequence F1 is present at the output of the multiplex circuit 33 and is compared in PLL circuit 16 with the pulse sequence representing the desired time difference F2, which corresponds to a value for the rated or desired number of revolutions of the rotor. From this comparison, a signal is generated by the PLL circuit 16 which controls the motor via line 21 or 22 without the mechanical tolerance variations of the tachogenerator, for example, due to inaccurate distribution of the code bars on the circumference of the rotor, becoming effective in the control process.

It is also possible to configure circuits 16, 29, 30, 31, 32, 33, switch S1 and memories I to n in the form of an integrated circuit microprocessor. In such a circuit, the actual time differences between adjacent pulse generating elements can also be evaluated for motor control.

The present disclosure relates to the subject matter disclosed in German Application No. P 37 18 207.2 of May 29th, 1987, the entire specification of which is incorporated herein by reference.

The invention now being fully described, it will be apparent to one of ordinary skill in the art that many changes and modifications can be made thereto without departing from the spirit or scope of the invention as set forth herein.

What is claimed:

1. An apparatus for controlling the number of revolutions of a rotor including tachometer means for generating a sequence of n pulses per revolution of the rotor with each pulse being generated when a respective one of n points on the circumference of the rotor passes a fixed point, means for evaluating the sequence of pulses to provide at least one control signal, and means for using said at least one control signal to control the number of revolutions of the rotor; an improvement wherein:

said means for evaluating includes means for determining the actual time difference between corresponding ones of said pulses of said sequence at the end of at least one complete revolution of the rotor, means for producing a first signal corresponding to a sequence representing the determined said actual time difference, and means for comparing said first signal with a second signal corresponding to a sequence representing a desired time difference and for deriving said at least one control signal from the result of the comparison;

said means for determining includes first means for storing each of said n pulses during one revolution of the rotor and for comparing each of the stored pulses with the corresponding pulse during a subsequent revolution of the rotor to determine the respective actual time difference and to produce a signal corresponding thereto;

said means for producing a first signal includes means for sequentially reading out the signals corresponding to the determined actual time differences from said first means; and said first means includes a respective pair of first and second memories associated with each of said n-pulses, means for alternatingly feeding said sequence of n-pulses to the respective first memories and the respective second memories on subsequent revolutions of the rotor, and a respective evaluation circuit means, connected to the output of each of said pair of memories, for determining the actual time difference between the pulses stored in said first and second memories.

2. The apparatus as defined in claim 1 wherein said means for comparing is a phase lock loop circuit.

3. The apparatus as defined in claim 1 wherein said first means are part of a microprocessor.

* * * * *